US011598885B2

(12) United States Patent
Peng et al.

(10) Patent No.: US 11,598,885 B2
(45) Date of Patent: Mar. 7, 2023

(54) METHOD FOR ADAPTIVE IDENTIFICATION OF ERRONEOUS GPS OBSERVED VALUE

(71) Applicant: Beijing IDRIVERPLUS Information Technology Co., Ltd., Beijing (CN)

(72) Inventors: Guoqi Peng, Beijing (CN); You Huang, Beijing (CN); Guolong Zhang, Beijing (CN); Fang Zhang, Beijing (CN); Xiaofei Li, Beijing (CN); Dezhao Zhang, Beijing (CN); Xiao Wang, Beijing (CN); Shuhao Huo, Beijing (CN)

(73) Assignee: Beijing IDRIVERPLUS Information Technology Co., Ltd., Beijing (CN)

( * ) Notice: Subject to any disclaimer, the term of this patent is extended or adjusted under 35 U.S.C. 154(b) by 142 days.

(21) Appl. No.: 17/231,317

(22) Filed: Apr. 15, 2021

(65) Prior Publication Data
US 2021/0333414 A1    Oct. 28, 2021

(30) Foreign Application Priority Data

Apr. 24, 2020 (CN) .......................... 202010334880.1

(51) Int. Cl.
*G01S 19/47* (2010.01)
*G01S 19/39* (2010.01)
*G01S 19/41* (2010.01)

(52) U.S. Cl.
CPC ............ *G01S 19/396* (2019.08); *G01S 19/47* (2013.01); *G01S 19/41* (2013.01)

(58) Field of Classification Search
CPC ......... G01S 19/47; G01S 19/49; G01S 19/396
(Continued)

(56) References Cited

U.S. PATENT DOCUMENTS

2016/0349362 A1* 12/2016 Rohr ....................... G01S 13/86

FOREIGN PATENT DOCUMENTS

| CN | 105676232 A | 6/2016 |
| CN | 106019339 A | 10/2016 |

(Continued)

OTHER PUBLICATIONS

International Search Report dated Jul. 28, 2021 in International Application No. PCT/CN2021/089744, with English translation, 7 pages.

*Primary Examiner* — Harry K Liu
(74) *Attorney, Agent, or Firm* — Nixon & Vanderhye P.C.

(57) ABSTRACT

Disclosed is a method for adaptive identification of erroneous GPS observed value, including: acquiring positioning information of a vehicle from a GPS sensor, and extracting first observed value data; acquiring posture information and speed information of the vehicle to acquire dead reckoning trajectory data of the vehicle; eliminating the erroneous GPS observed values based on respective data on data status value, heading significant bit, the number of satellites used and horizontal dilution of precision in the first observed value data to obtain second observed value data; constructing pose graph data based on the second observed value data and acquiring processing result information; analyzing and optimizing the processing result information to eliminate the erroneous GPS observed values of which the cost function exceeds a preset cost function threshold to obtain third observed value data; and constructing a high-precision map based on the third observed value data and three-dimensional scene map data.

4 Claims, 1 Drawing Sheet

(58) Field of Classification Search
USPC .................................................. 342/357.3
See application file for complete search history.

(56) References Cited

FOREIGN PATENT DOCUMENTS

| | | |
|---|---|---|
| CN | 106918827 A | 7/2017 |
| CN | 110906929 A | 3/2020 |
| CN | 111045067 A | 4/2020 |
| CN | 111562605 A | 8/2020 |
| WO | WO 2010/077791 A2 | 7/2010 |

* cited by examiner

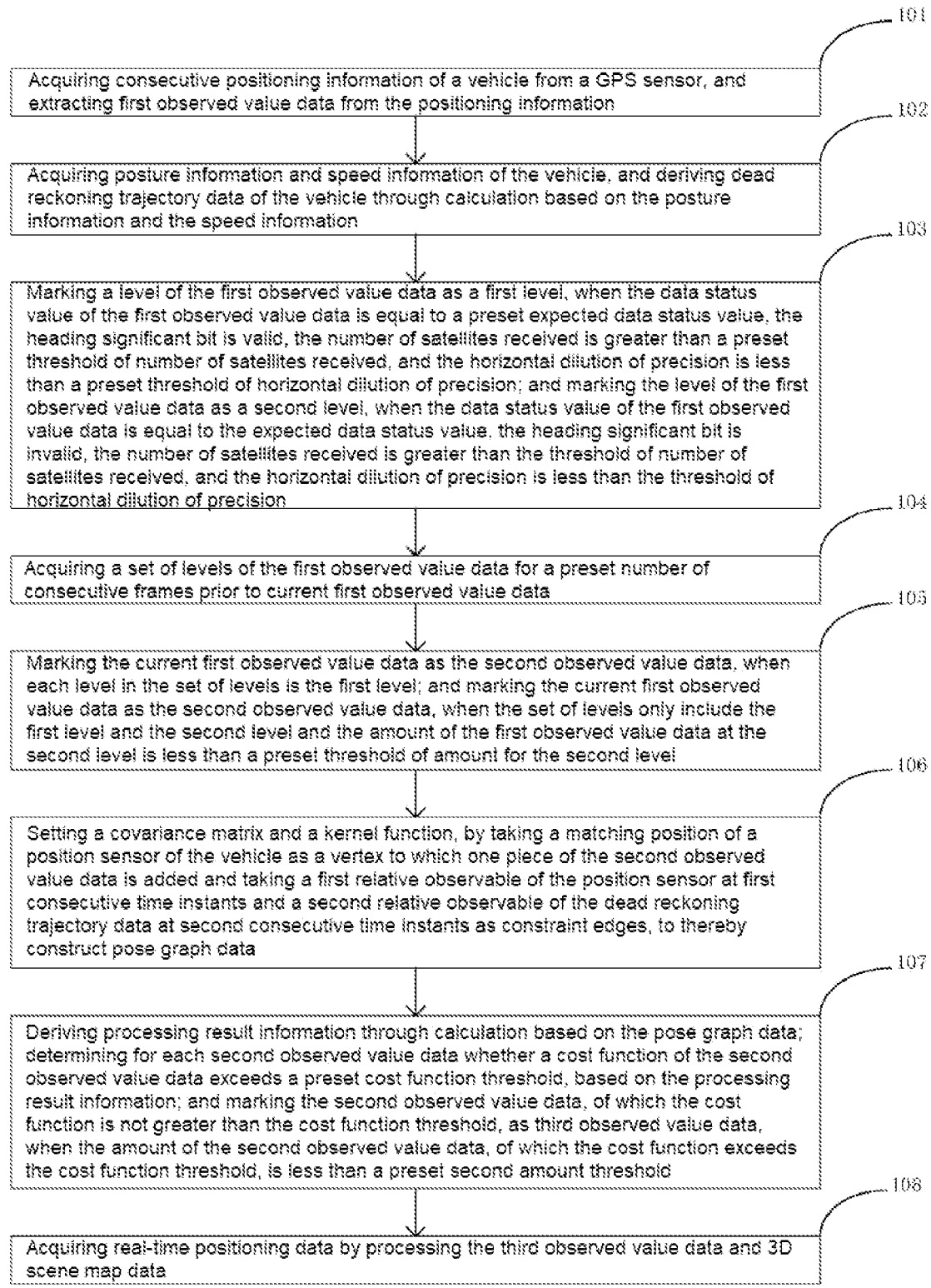

METHOD FOR ADAPTIVE IDENTIFICATION OF ERRONEOUS GPS OBSERVED VALUE

CROSS-REFERENCE TO RELATED PATENT APPLICATION

The present disclosure claims the benefit of and priority to Chinese Patent Application No. 202010334880.1 filed on Apr. 24, 2020, the entire disclosure of which is incorporated by reference herein.

TECHNICAL FIELD

The present disclosure relates to the technical field of real-time vehicle positioning, and in particular to a method for adaptive identification of an erroneous GPS observed value.

BACKGROUND

Autonomous driving technology has been a hot topic in recent years, and will bring disruptive changes in easing traffic congestion, improving road safety, reducing air pollution, and other areas. In the process of commercialization of the autonomous driving, unmanned sweepers, unmanned express delivery vehicles, and unmanned taxis in limited area scenarios provide specific application scenarios for implementation of the autonomous driving technology. Due to the increasing population aging, the rising domestic labor costs and the heavy repetitive manual labor, such as environmental sanitation cleaning, express delivery, and taxi driving, has increased the work burden of people. Thus, it is overwhelming to replace the repetitive work with the autonomous driving technology.

The high-precision map and highly robust positioning method are essential for the autonomous driving of unmanned vehicles. In outdoor unmanned driving application scenarios, the Global Positioning System (GPS) is used as a data input sensor both in three-dimensional (3D) scene reconstruction and in real-time vehicle positioning. If erroneous observed values input by GPS (i.e. erroneous positioning data from GPS, hereinafter referred to as erroneous GPS observed value) are not correctly identified and eliminated, it will lead to the reduced accuracy of the constructed 3D scene map, and the erroneous values that are not eliminated will cause the positioning results to deviate seriously from the actual position, thereby affecting the safety and reliability of autonomous driving of the vehicle.

At present, the widely used methods for identification of erroneous GPS observed values generally include an identification method based on own GPS observed values and an identification method based on combination of GPS observed values and an accelerometer.

The identification method based on own GPS observed values mainly includes a Kalman filter method and a method with combination of classical probability and Laiyite discrimination. Particularly, data processing models, such as prediction models and error probability distribution models of the Kalman filter, are acquired firstly from sample data. Then, a reasonable processing model and parameter thresholds are selected to analyze the GPS data observed in real time. Finally, whether the GPS data is an erroneous value or not is determined based on the analysis result. According to the identification method based on own GPS observed values, pre-planned motion trajectories and sample data are required to obtain the corresponding model. However, due to different working hours, the GPS observed values may suffer from certain differences, and there is no guarantee that the vehicle will strictly follow the preset track during its movement. Thus, it is difficult to accurately analyze errors of the GPS observed values with the processing module.

According to the identification method based on combination of GPS observed values and an accelerometer, the speed and position variations of the accelerometer as well as the GPS observed values are acquired within a predetermined time, and GPS predicted values are acquired based on data variations of the accelerometer. Then, whether an absolute deviation between the GPS observed values and the GPS predicted values is less than a certain value or not is determined, and if not, the GPS observed value at this moment is determined as an erroneous value. The identification method based on combination of GPS observed values and the accelerometer can well identify jumping erroneous values of the GPS. However, during autonomous driving of the vehicle, the GPS is affected by the multipath effect so that errors with gradual changes and errors with step changes may both occur in the GPS observed values, while those errors of the observed values cannot be identified by the combination of GPS and recursion of the accelerometer within a predetermined time.

SUMMARY

An object of the present disclosure is to provide a method for adaptive identification of an erroneous GPS observed value in view of the defects in the prior art.

In order to achieve the object, the present disclosure discloses a method for adaptive identification of an erroneous GPS observed value, which comprises:

acquiring consecutive positioning information of a vehicle from a GPS sensor of the vehicle;

extracting first observed value data from the positioning information, where the first observed value data includes respective data on data status value, heading significant bit, the number of satellites used and horizontal dilution of precision;

acquiring posture information and speed information of the vehicle;

deriving dead reckoning trajectory data of the vehicle from calculation based on the posture information and the speed information;

marking a level of the first observed value data as a first level, when the data status value of the first observed value data is equal to a preset expected data status value, the heading significant bit is valid, the number of satellites used is greater than a preset threshold of number of satellites used, and the horizontal dilution of precision is less than a preset threshold of horizontal dilution of precision;

marking a level of the first observed value data as a second level, when the data status value of the first observed value data is equal to the expected data status value, the heading significant bit is invalid, the number of satellites used is greater than the threshold of number of satellites used, and the horizontal dilution of precision is less than the threshold of horizontal dilution of precision;

acquiring a set of levels of the first observed value data for a preset number of consecutive frames prior to current first observed value data;

marking the current first observed value data as second observed value data, when each level in the set of levels is the first level;

marking the current first observed value data as the second observed value data, when the set of levels only includes the first level and the second level, and the amount of the first observed value data at the second level is less than a preset threshold of amount for the second level;

setting a covariance matrix and a kernel function, by taking a matching position of a position sensor of the vehicle as a vertex to which one piece of the second observed value data is added and taking a first relative observable of the position sensor at first consecutive time instants and second relative observable of the dead reckoning trajectory data at second consecutive time instants as constraint edges, to thereby construct pose graph data;

deriving processing result information from calculation based on the pose graph data;

determining for each second observed value data whether a cost function of the second observed value data exceeds a preset cost function threshold, based on the processing result information; marking the second observed value data, of which the cost function is not greater than the cost function threshold, as third observed value data, when the amount of the second observed value data, of which the cost function exceeds the cost function threshold, is less than a preset second amount threshold; and acquiring real-time positioning data by processing the third observed value data and three-dimensional scene map data.

Furthermore, the level of the first observed value data is marked as a third level when the data status value of the first observed value data is not equal to the expected data status value, or the number of satellites used is not greater than the threshold of number of satellites used, or the horizontal dilution of precision is not less than the threshold of horizontal dilution of precision.

Furthermore, the posture information is derived through calculation by an inertial measurement unit of the vehicle; and the speed information is derived through calculation by a wheel speed sensor of the vehicle.

Furthermore, after determining for each second observed value data whether the cost function of the second observed value data exceeds the preset cost function threshold, based on the processing result information, the method further comprises:

acquiring a second cost function threshold by enlarging the cost function threshold in multiples, when the amount of the second observed value data, of which the cost function exceeds the cost function threshold, is not less than the second amount threshold; and determining for each second observed value data whether the cost function of the second observed value data exceeds the second cost function threshold, based on the processing result information; and marking the second observed value data, of which the cost function is not greater than the second cost function threshold, as the third observed value data, when the amount of the second observed value data, of which the cost function exceeds the second cost function threshold, is less than the second amount threshold.

According to the method for adaptive identification of an erroneous GPS observed value provided by the present disclosure, the erroneous observed values may be identified and eliminated quickly in the first place through relevant flag bits based on differential GPS data. Then, the remaining observed values are subjected to secondary identification based on a pose graph problem to further eliminate the erroneous observed values. After that, the remaining correct GPS observed values are output for construction of the 3D scene map to complete construction of a high-precision map, so that high-precision real-time positioning with high robustness and safety can be ensured. As a result, the probability of safety problems caused by erroneous observed values can be reduced, and the accuracy of 3D map reconstruction and vehicle real-time positioning in the complex outdoor environment can be improved.

BRIEF DESCRIPTION OF THE DRAWINGS

FIG. 1 is a schematic flowchart of a method for adaptive identification of an erroneous GPS observed value according to embodiments of the present disclosure.

DETAILED DESCRIPTION

The technical solution of the present disclosure will be further described in detail below through the accompanying drawing and embodiments.

The method for adaptive identification of an erroneous GPS observed value according to embodiments of the present disclosure is applicable to an in-vehicle server of a smart vehicle. The smart vehicle herein may be understood as an unmanned autonomous vehicle, and the in-vehicle server is equivalent to a brain of the autonomous vehicle, which can acquire and process data from many sensors on the vehicle and thereby obtain vehicle state information and environmental information around the vehicle for constructing environmental map and positioning the vehicle in real time to realize autonomous driving of the vehicle.

Numbers, such as the first or the second, are merely for the sake of distinction and have no other meaning.

FIG. 1 is a schematic flowchart of a method for adaptive identification of an erroneous GPS observed value according to embodiments of the present disclosure. The method for adaptive identification of an erroneous GPS observed value is applicable to an in-vehicle server of a smart vehicle, and an application scenario of the method is a scenario where the GPS data is processed and the erroneous GPS observed values are identified when the autonomous vehicle is driven autonomously in an outdoor environment. As shown in FIG. 1, an execution body of the method is the in-vehicle server of the smart vehicle, and the method for adaptive identification of an erroneous GPS observed value includes following steps.

In step 101, consecutive positioning information of a vehicle is acquired from a GPS sensor, and first observed value data is extracted from the positioning information.

When an autonomous vehicle is running in an outdoor environment, the in-vehicle server of the vehicle may acquire consecutive positioning information of the vehicle from the GPS sensor of the vehicle. The first observed value data required by this identification method is obtained by extraction from each positioning information. The first observed value data includes respective data on data status value, heading significant bit, the number of satellites used and horizontal dilution of precision.

In step 102, posture information and speed information of the vehicle is acquired, and dead reckoning trajectory data of the vehicle is derived from the calculation based on the posture information and the speed information.

The in-vehicle server may acquire posture information of the vehicle from an inertial measurement unit (IMU) sensor, and acquire the speed information of the vehicle from a wheel speed sensor of the vehicle. Then, the dead reckoning trajectory data of the vehicle may be derived from the calculation based on the posture information and the speed information.

In step 103, a level of the first observed value data is marked as a first level, when the data status value of the first observed value data is equal to a preset expected data status value, the heading significant bit is valid, the number of satellites used is greater than a preset threshold of number of satellites used, and the horizontal dilution of precision is less than a preset threshold of horizontal dilution of precision; and the level of the first observed value data is marked as a second level, when the data status value of the first observed value data is equal to the expected data status value, the heading significant bit is invalid, the number of satellites used is greater than the threshold of number of satellites used, and the horizontal dilution of precision is less than the threshold of horizontal dilution of precision.

For each first observed value data acquired in step 101, respective data on the data status value, heading significant bit, the number of satellites used and horizontal dilution of precision thereof may be subjected to determination processing. The determination processing may be performed based on a reasonable preset expected data status value, a threshold of number of satellites used, and a threshold of horizontal dilution of precision.

The level of the first observed value data is marked as the first level, when the data status value of the first observed value data is equal to a preset expected data status value, the heading significant bit is valid, the number of satellites used is greater than a preset threshold of number of satellites used, and the horizontal dilution of precision is less than a preset threshold of horizontal dilution of precision.

The level of the first observed value data is marked as the second level, when the data status value of the first observed value data is equal to the preset expected data status value, the heading significant bit is invalid, the number of satellites used is greater than the preset threshold of number of satellites used, and the horizontal dilution of precision is less than the preset threshold of horizontal dilution of precision.

In addition, the level of the remaining first observed data, which belongs to neither the first level nor the second level, may be marked as the third level.

In step 104, a set of levels of the first observed value data for a preset number of consecutive frames prior to current first observed value data is acquired.

The preset number of consecutive frames may be configured to be L, where 3<L<20. The set of levels of the first observed value data for the consecutive L frames prior to the current first observed value data may be acquired.

In step 105, the current first observed value data is marked as the second observed value data, when each level in the set of levels is the first level; and the current first observed value data is marked as the second observed value data, when the set of levels only includes the first level and the second level, and the amount of the first observed value data at the second level is less than a preset threshold of amount for the second level.

A determination may be performed based on the set of levels acquired in step 104 for the first observed value data extracted in consecutive L frames.

1. It may be deemed that the current first observed value data is in a good state when each level of in the set of levels is the first level.

2. It may be deemed that the current first observed value data is in a normal state when the set of levels only includes the first level and the second level, and the amount of the first observed value data at the second level is less than a preset threshold of amount for the second level.

If none of the above two conditions is met, the current first observed value data may be deemed to be in a poor state. The first observed value data in the poor state may be eliminated, and only the first observed value data in the good and normal states may be reserved. In addition, those first observed value data may be marked as the second observed data for serving as an input for a next secondary identification.

In step 106, a covariance matrix and a kernel function are set by taking a matching position of a position sensor of the vehicle as a vertex to which one piece of the second observed value data is added and taking a first relative observable of the position sensor at first consecutive time instants and a second relative observable of the dead reckoning trajectory data at second consecutive time instants as constraint edges to thereby construct pose graph data.

A pose graph problem may be constructed to perform secondary identification on the second observed value data as reserved after the identification in step 105.

The matching position of the position sensor of the vehicle is taken as the vertex, where the position sensor of the vehicle may be a laser sensor or a camera sensor of the vehicle. Each vertex may be added with one piece of the second observed value data to ensure smoothness of the local trajectory shape and prevent the occurrence of distortion. By taking the first relative observable of the position sensor at the first consecutive time instants and the second relative observable of the dead reckoning trajectory data at the second consecutive time instants as constraint edges, a corresponding covariance matrix and kernel function may be set according to properties of respective sensors to thereby construct the pose graph data.

In step 107, processing result information is derived from the calculation based on the pose graph data; for each second observed value data, whether a cost function of the second observed value data exceeds a preset cost function threshold is determined based on the processing result information; and the second observed value data, of which is not greater than the cost function threshold, is marked as third observed value data when the amount of the second observed value data, of which the cost function exceeds the cost function threshold, is less than a preset second amount threshold.

The processing result information may be derived by perform calculation on the pose graph data constructed in step 106. The processing result information may be analyzed and optimized, which may include that, for each second observed value data input in step 106, whether the cost function exceeds the preset cost function threshold is determined to count.

In an example, the second observed value data, of which the cost function is not greater than the cost function threshold, may be marked as the third observed value data when the amount of the second observed value data, of which the cost function exceeds the cost function threshold, is less than the preset second amount threshold, while the second observed value data, of which the cost function is greater than the cost function threshold, may be the erroneous GPS observed value and shall be eliminated.

In another example, when the amount of the second observed value data, of which the cost function exceeds the cost function threshold, is not less than the preset second amount threshold, it may be required to enlarge the cost function threshold in multiples to obtain a second cost function threshold, so that the method can automatically adapt to more complex outdoor environments. Then, the processing result information may be further analyzed and optimized based on a second cost function, which may include that, for each second observed value data input in step 106, whether the cost function exceeds the second cost function threshold is determined to count. When the amount of the second observed value data, of which the cost function exceeds the second cost function threshold, is less than the preset second amount threshold, the second observed value data, of which the cost function is not greater than the second cost function threshold, may be marked as the third observed value data, and the second observed value data, of which the cost function is greater than the second cost function threshold, may be the erroneous GPS observed value and shall be eliminated.

In step 108, real-time positioning data is acquired by processing the third observed value data and 3D scene map data.

The third observed value data generated in step 107 is the correct GPS observed values obtained after performing the secondary identification and eliminating the erroneous observed values. The third observed value data may be output to the 3D scene map, to be combined with the 3D scene map data to complete construction of the high-precision map, thereby achieving the high-precision real-time positioning of the vehicle.

According to the method for adaptive identification of an erroneous GPS observed value according to embodiments of the present disclosure, the erroneous observed values may be identified and eliminated quickly in the first place through relevant flag bits based on differential GPS data. Then, the remaining observed values are subjected to secondary identification based on a pose graph problem to further eliminate the erroneous observed values. After that, the remaining correct GPS observed values are output for construction of the 3D scene map to complete construction of a high-precision map, so that the high-precision real-time positioning with high robustness and safety can be ensured. As a result, the probability of safety problems caused by erroneous observed values can be reduced, and the accuracy of 3D map reconstruction and vehicle real-time positioning in the complex outdoor environment can be improved.

Those skilled in the art shall be further aware that the units and algorithm steps of examples described in the embodiments of the present disclosure can be implemented by an electronic hardware, computer software, or a combination thereof. In order to clearly illustrate the interchangeability of hardware and software, the composition and steps of each example have been generally illustrated in the above description in accordance with the functions. Whether these functions are executed by hardware or software depends on the specific application and design constraints of the technical solution. Those skilled in the art may implement the described functions in varying ways for each particular application, and such implementation should not be interpreted as exceeding the scope of the present disclosure.

The steps of the method or algorithm described in combination with the embodiments of the present disclosure can be implemented by hardware, or a software module executed by a processor, or a combination thereof. The software module may be placed in a random access memory (RAM), an internal memory, a read-only memory (ROM), an electrically programmable ROM, an electrically erasable programmable ROM, a register, a hard disk, a removable disk, or any other form of storage medium known in the art.

The above specific implementations further describe the object, technical solutions and beneficial effects of the present disclosure in detail. It should be understood that the implementations are only specific implementations of the present disclosure and are not intended to limit the protection scope of the present disclosure. Any modification, equivalent replacement, improvement, or the like made within the spirit and principle of the present disclosure shall be included in the protection scope of the present disclosure.

What is claimed is:

1. A method for adaptive identification of an erroneous GPS observed value, comprising:

acquiring consecutive positioning information of a vehicle from a GPS sensor of the vehicle;

extracting first observed value data from the positioning information, wherein the first observed value data comprises respective data on data status value, heading significant bit, the number of satellites used and horizontal dilution of precision;

acquiring posture information and speed information of the vehicle;

deriving dead reckoning trajectory data of the vehicle from calculation based on the posture information and the speed information;

marking a level of the first observed value data as a first level, when the data status value of the first observed value data is equal to a preset expected data status value, the heading significant bit is valid, the number of satellites used is greater than a preset threshold of number of satellites used, and the horizontal dilution of precision is less than a preset threshold of horizontal dilution of precision;

marking the level of the first observed value data as a second level, when the data status value of the first observed value data is equal to the expected data status value, the heading significant bit is invalid, the number of satellites used is greater than the threshold of number of satellites used, and the horizontal dilution of precision is less than the threshold of horizontal dilution of precision;

acquiring a set of levels of the first observed value data for a preset number of consecutive frames prior to current first observed value data;

marking the current first observed value data as second observed value data, when each level in the set of levels is the first level;

marking the current first observed value data as the second observed value data, when the set of levels only include the first level and the second level and the amount of the first observed value data at the second level is less than a preset threshold of amount for the second level;

setting a covariance matrix and a kernel function, by taking a matching position of a position sensor of the vehicle as a vertex to which one piece of the second observed value data is added and taking a first relative observable of the position sensor at first consecutive time instants and a second relative observable of the dead reckoning trajectory data at second consecutive time instants as constraint edges, to thereby construct pose graph data;

deriving processing result information from calculation based on the pose graph data;

determining for each second observed value data whether a cost function of the second observed value data exceeds a preset cost function threshold, based on the processing result information; marking the second observed value data, of which the cost function is not greater than the cost function threshold, as third observed value data, when the amount of the second observed value data, of which the cost function exceeds the cost function threshold, is less than a preset second amount threshold; and acquiring real-time positioning data by processing the third observed value data and three-dimensional scene map data.

2. The method according to claim 1, further comprising: marking the level of the first observed value data as a third level, when the data status value of the first observed value data is not equal to the expected data status value, or the number of satellites used is not greater than the threshold of number of satellites used, or the horizontal dilution of precision is not less than the threshold of horizontal dilution of precision.

3. The method according to claim 1, wherein the posture information is derived through calculation by an inertial measurement unit of the vehicle; and the speed information is derived through calculation by a wheel speed sensor of the vehicle.

4. The method according to claim 1, wherein after determining for each second observed value data whether the cost function of the second observed value data exceeds the preset cost function threshold, based on the processing result information, the method further comprises:

acquiring a second cost function threshold by enlarging the cost function threshold in multiples, when the amount of the second observed value data, of which the cost function exceeds the cost function threshold, is not less than the second amount threshold; and determining for each second observed value data whether the cost function of the second observed value data exceeds the second cost function threshold, based on the processing result information; and marking the second observed value data, of which the cost function is not greater than the second cost function threshold, as the third observed value data, when the amount of the second observed value data, of which the cost function exceeds the second cost function threshold, is less than the second amount threshold.

\* \* \* \* \*